United States Patent

Kanemitsu et al.

Patent Number: 5,152,679
Date of Patent: Oct. 6, 1992

[54] TURBO MOLECULAR PUMP

[75] Inventors: Yoichi Kanemitsu; Yuji Shirao, both of Kanagawa, Japan

[73] Assignee: Ebara Corporation, Tokyo, Japan

[21] Appl. No.: 740,779

[22] Filed: Aug. 6, 1991

[30] Foreign Application Priority Data

Aug. 10, 1990 [JP] Japan .................. 1-210426

[51] Int. Cl.5 ............................. F04B 17/04
[52] U.S. Cl. ................................. 417/423.4
[58] Field of Search ............ 417/423.4, 352, 353, 417/354; 415/90; 310/90.5

[56] References Cited

U.S. PATENT DOCUMENTS

| 3,747,998 | 7/1973 | Klein et al. | |
| 3,958,842 | 5/1976 | Telle | 310/90.5 |
| 4,057,369 | 11/1977 | Isenberg et al. | 417/423.4 |
| 4,563,046 | 1/1986 | Shimamoto | 310/90.5 |
| 4,717,315 | 1/1988 | Miki et al. | 417/423.4 |
| 4,797,062 | 1/1989 | Deters et al. | 415/90 |
| 4,822,251 | 4/1989 | Amrath et al. | 415/90 |

FOREIGN PATENT DOCUMENTS

| 2293623 | 12/1975 | France . |
| 2500688 | 8/1982 | France . |
| 2534980 | 9/1983 | France . |

Primary Examiner—Richard A. Bertsch
Assistant Examiner—Alfred Basichas
Attorney, Agent, or Firm—Armstrong, Nikaido, Marmelstein, Kubovcik & Murray

[57] ABSTRACT

A turbo molecular pump includes a magnetic bearing system which includes a rotor having an impeller connected to a shaft and a motor. A stator is positioned between the shaft and the impeller. Radial magnetic bearings, an active axial magnetic bearing and emergency bearings are each provided between the rotor and the stator. The radial magnetic bearings include passive magnetic bearings provided on the rotor and the stator respectively. The axial magnet bearing is disposed in the vicinity where the impeller is connected to the shaft. The emergency bearings are disposed on a low vacuum side with one emergency bearing being positioned near the axial magnetic bearing. A diameter of the shaft is made smaller than an inside diameter of the emergency bearing near the axial magnetic bearing. By this arrangement, only one control axis is necessary for controlling the position of the rotor. Disassembling of the shaft and impeller is easy and contamination of the high vacuum side can be prevented.

5 Claims, 5 Drawing Sheets

TURBO MOLECULAR PUMP

BACKGROUND OF THE INVENTION

1. Field of the Art

The present invention relates to a turbo molecular pump including a magnetic bearing system.

2. Prior Art

A turbo molecular pump including a magnetic bearing system is known. For example, a prior art turbo molecular pump having active magnetic bearings is shown in FIG. 4. As shown, the turbo molecular pump comprises an impeller 1, a stator 2 and a shaft 1a integrated with the impeller 1, and a motor 12 is provided on an intermediate portion of the shaft 1a. Active magnetic bearings 3, 4 are each provided as radial bearings, and active magnetic bearings 5, 6 are provided as axial bearings. Reference numerals 10, 11 in FIG. 4 denote emergency bearings, 7 and 8 radial displacement detectors and 9 an axial displacement detector.

While not illustrated definitely therein, 5-axis active magnetic bearings include four active radial magnetic bearings and one active axial magnetic bearing.

Further, a prior art turbo molecular pump having a single axis active magnetic bearing system is shown in FIG. 5. The magnetic bearing system of FIG. 5 includes a passive magnetic bearing 13 as a radial bearing, and the active magnetic bearings 5, 6 as axial bearings, and is further provided with the emergency bearings 10, 11 as in the case of FIG. 4.

Reference numeral 14 in FIG. 5 denotes a shaft end protruding into the high vacuum side, 15 an emergency bearing retainer and 16 a pump casing.

However, in case of 5-axis active magnetic bearings of FIG. 4, since the number of control axes is many, high manufacturing costs may result, and control itself is made complicated thus impairing the reliability thereof. Further, since the axial control bearings 5, 6 are positioned near a shaft end on the side opposite to the impeller 1 of the rotor, the axial magnetic bearings 5, 6 must be disassembled to remove the impeller 1 from a pump for maintenance or like operations.

On the other hand, in the case of single axis active magnetic bearing of FIG. 5, since the emergency bearing 10 is positioned in a high vacuum side, impurities such as dust or the like which are produced when the emergency bearing is actuated on the high vacuum side may flow back to a vacuum vessel to be evacuated. Further, as in the case of FIG. 4, the axial magnetic bearings 5, 6 must be disassembled upon removing the impeller 1 from the pump.

SUMMARY OF THE INVENTION

The present invention has been proposed in view of the aforementioned problems inherent in the prior art, and its object is to provide a turbo molecular pump which has the fewest number of control axes, an is easy to disassemble and reassemble, and which will not contaminate the high vacuum side.

In order to attain the above objects, the turbo molecular pump according to the invention includes a magnetic bearing system which comprises a rotor consisting of an impeller connected to a shaft and a motor. A stator is positioned between the shaft and the impeller. Radial magnetic bearings, an active axial magnetic bearing and emergency bearings are each provided between the rotor and the stator. The radial magnetic bearings comprise passive radial magnetic bearings each having a permanent magnet and provided on the rotor and the stator respectively. The axial magnet bearing is disposed in the vicinity where the impeller is connected to the shaft. The passive radial magnetic bearing search have ring permanent magnets magnetized axially and are disposed concentrically so as to radially oppose each other the pair of concentrically disposed passive radial magnet bearings are provided at more than one position which are axially displaced. The permanent magnet, disposed on the rotor, and a permanent magnet, disposed on the stator, are slightly deviated in an axial direction. The emergency bearings are disposed on a low vacuum side with one emergency bearing being positioned near the axial magnetic bearing. And diameter of the shaft is made smaller than an inside diameter of the emergency bearing near the axial magnetic bearing.

It is preferable that an axial control magnetic bearing comprises a device for detecting an axial position thereof, and a control device for controlling a current flowed to an electromagnet according to a positional signal detected by the detection device. One electromagnet of the bearing will be disposed on a portion where the impeller and the shaft are jointed together on a low vacuum side.

According to the present invention having a construction described above, a turbo molecular pump having single axis active magnetic bearings is realized. Further, the turbo molecular pump can easily be disassembled and reassembled thus enabling a reduction in time and labor therefore, and a fault such as disconnection of a control coil or the like which may easily occur at the time of disassembly and reassembly can be prevented. Still further, a structure with emergency bearings being disposed on the low vacuum side can be realized to prevent contamination in the high vacuum side with impurities such as dust or the like.

According to the turbo molecular pump of the present invention, the radial magnetic bearing is constructed as a passive type utilizing a repulsion force of a permanent magnet, and an axial unstable force generated in this case is controlled by an electromagnet of the active axial magnetic bearing for stabilization. That is, according to the present invention, the permanent magnets disposed on a rotor and a permanent magnets disposed on a stator are deviated slightly in an axial direction. Thus, a force acting constantly in the axial direction due to a mutual repulsion force of the permanent magnets is generated, and such a force may be controlled by controllably generating a force in an electromagnet of the active axial bearing in an axial direction.

A sampling mechanism for damping radial vibrations of the rotor may be provided on at least one pair of the permanent magnets of the radial magnetic bearings, and a support device for radial magnet bearing and a sliding mechanism which fixes the support axially but allows radial movement of the same is provided on one of the pair of magnets, therefore damping radial vibrations of the shaft.

Further, since an axial control magnetic bearing is disposed where an impeller and a shaft are jointed together, and the diameter of a shaft portion of the rotor is made smaller than an inside diameter of the emergency bearing, and thus in the turbo molecular pump of the present invention, the rotor does not come in contact with the emergency bearing when it is removed. Accordingly, the rotor can be removed simply by demounting a shaft end nut and a spacer, thus facilitating the work for disassembling and reassembling.

Still further, by disposing the emergency bearings on a low vacuum side, the high vacuum side can be prevented from being bearing contaminated despite operation of the emergency bearings.

In short, according to the present invention, the rotor is supported radially by the passive magnetic bearing using a permanent magnet, and only the axial magnetic bearing is made to work actively, thereby providing a turbo molecular pump with a coil of the electromagnet being kept to one only and the number of control axis being kept to a minimum. Also, the emergency bearings are disposed on a low vacuum side. Thus the turbo molecular pump is easy to disassemble and reassemble and will not contaminate the high vacuum side.

The above and other objects, features and advantages of the present invention will become more apparent from the following description when taken in conjunction with the accompanying drawings in which a preferred embodiment of the present invention is shown by way of illustrative examples.

PREFERRED EMBODIMENT OF THE INVENTION:

An embodiment of the present invention will now be described with reference to FIG. 1 to FIG. 3.

Figure 1:
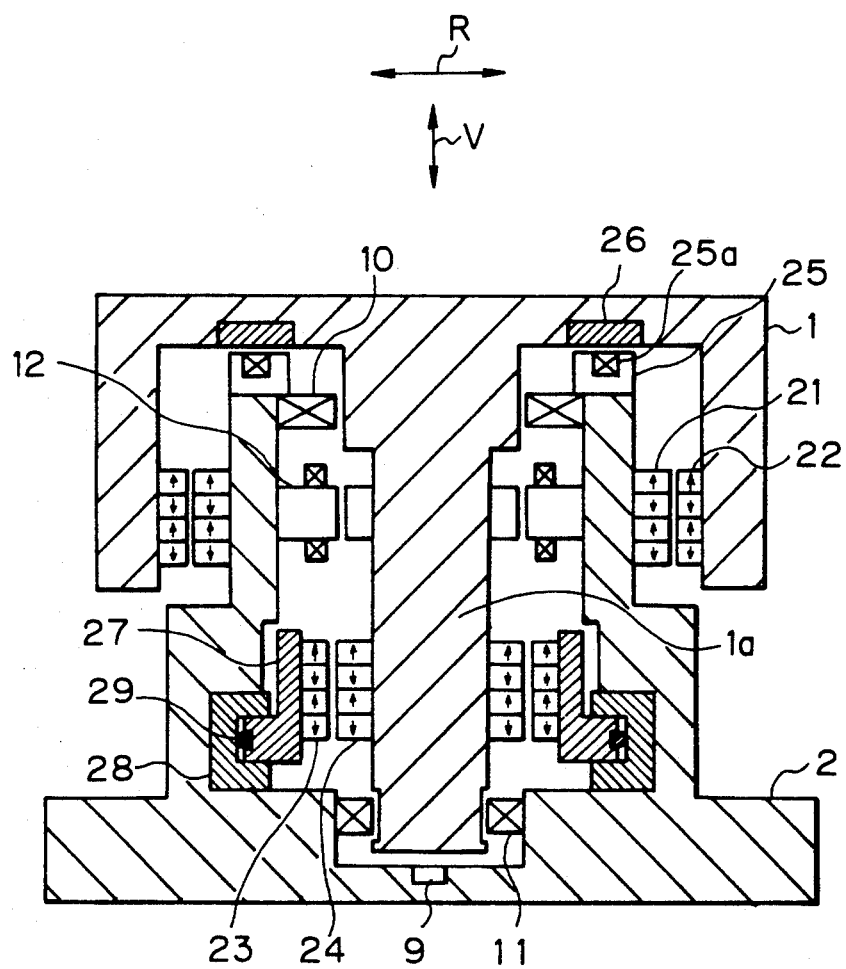
FIG. 1 is a sectional view represented in simplification for showing a working principle of an embodiment of the present invention.
Figure 2:
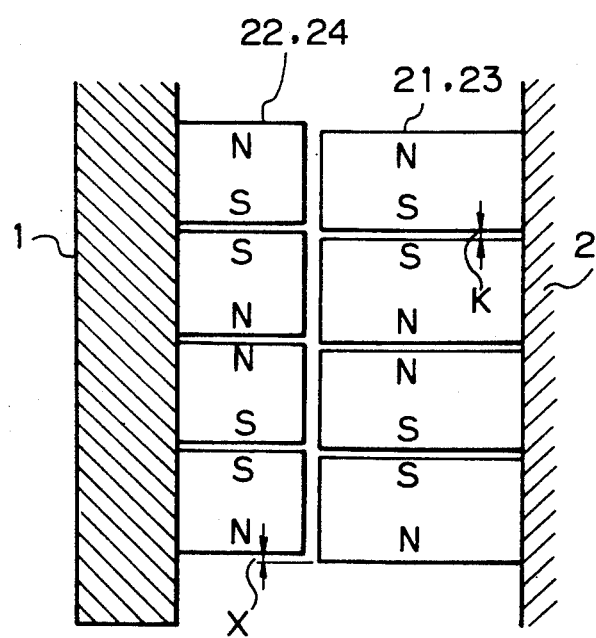
FIG. 2 is a fragmentary enlarged view of FIG. 1.
Figure 4:
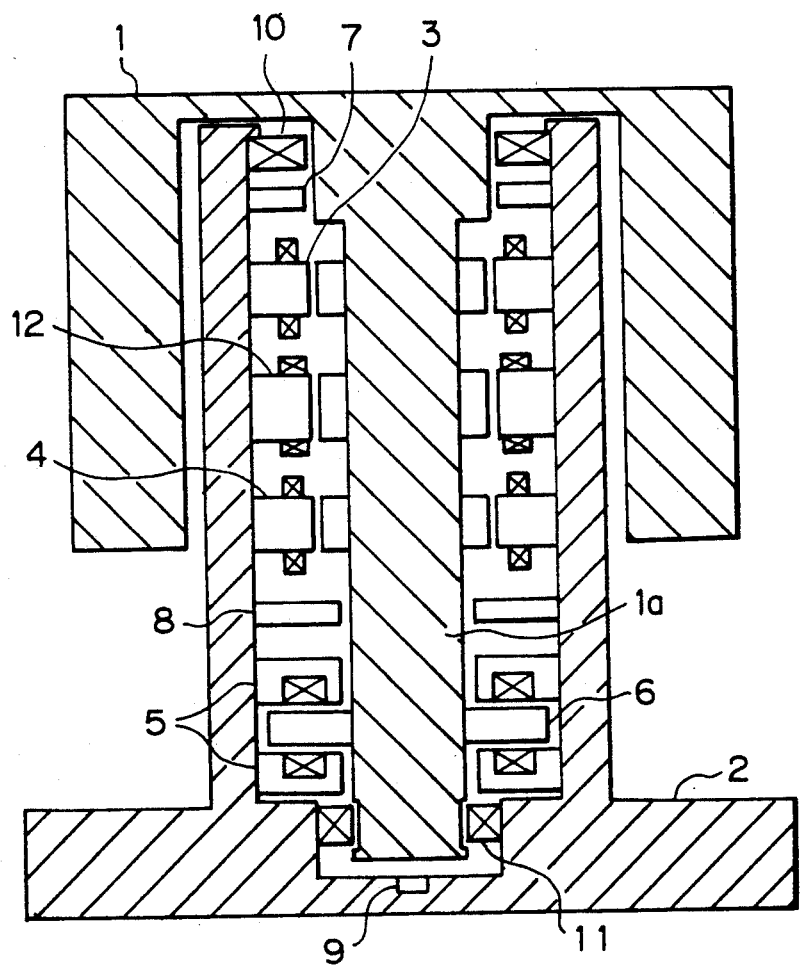
FIG. 4 is a sectional view showing a prior art.
Figure 5:
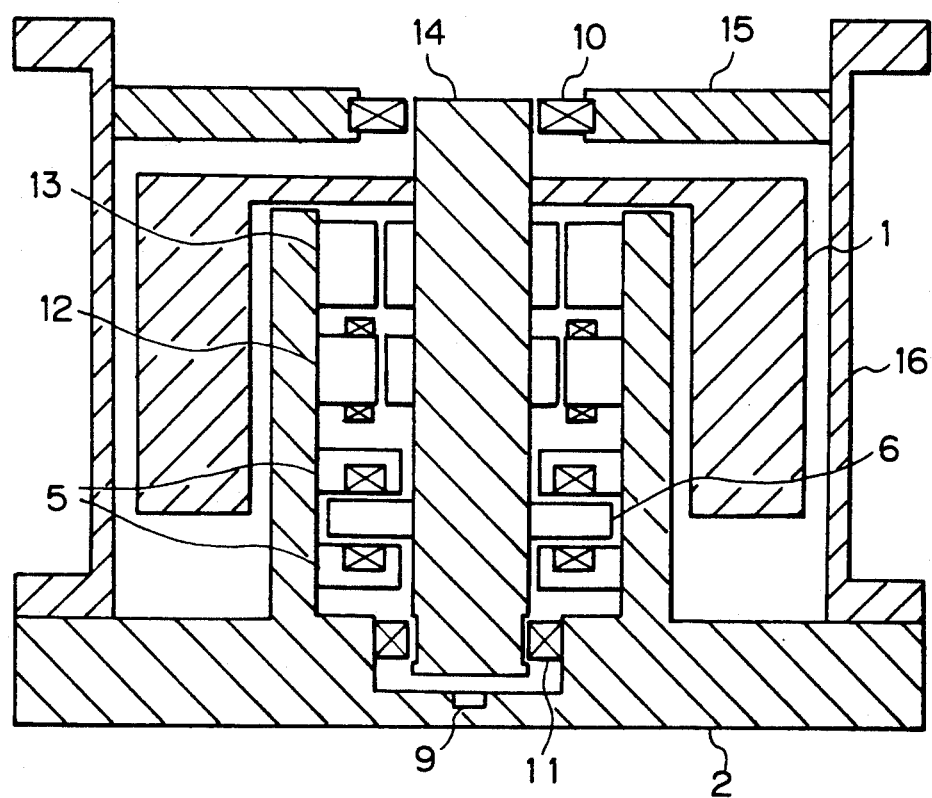
FIG. 5 is a sectional view showing another prior art.

FIG. 1 and FIG. 2 represent the embodiment of the present invention in simplification. Here, like reference characters represent like members shown in FIG. 4 and FIG. 5.

In the illustrations, radial (as indicated by R) magnetic bearings 21, 22, 23, 24 each consists of a group of permanent magnets are constructed as a passive type magnetic bearing utilizing a repulsion force of the permanent magnets. A pair of concentrically disposed radial magnet bearings 21 22 is provided between the impeller 1 and the stator or fixed part 2, while another pair of magnet bearings 23, 24 is provided between the shaft 1a and the stator 2. Then, an axial (as indicated by V) unstable force which is generated in the group of permanent magnets of the passive magnetic bearings 21, 22, 23, 24 is controlled by an electromagnet of active axial magnetic bearings 25, 26 for stabilization.

The group of permanent magnets of the passive radial magnetic bearings 21, 22, 23, 24 are correlated in position as shown in FIG. 2. That is, the permanent magnets 22, 24 of the bearing mounted on the rotor side are slightly deviated axially upward by an amount X with reference to the permanent magnets 21, 23 of the bearing mounted on the stator 2 side. Then, from such upward deviation, a force acts on the shaft 1a always axially (V) upward due to a mutual repulsion force of the permanent magnets.

Also, the permanent magnets 21, 22, 23, 24 have a small clearance k provided between the axially adjacent magnets, and are disposed so that they have the same polarity on faces of the magnets adjacent to each other.

Again in FIG. 1, the active axial magnetic bearings 25, 26 are disposed in the vicinity of a portion where the impeller 1 and the shaft 1a are jointed together. Here, a reference numeral 25 denotes an electromagnet portion in the bearing, and 25a denotes its coil. By controlling a current flowing to the coil 25a by a control means (not indicated), an axial force of the active axial magnetic bearing is controlled. Thus, stable support of the bearing in the axial direction V is realized by the controlled axial force given by the axial magnetic bearings 25, 26 and the axial force generated in the group of permanent magnets of the aforementioned radial magnetic bearings 21, 22, 23, 24.

In operation, axial displacement of the rotor is detected by a detector 9 and is output to a control means (not shown), the control means calculates an axial (V) force to be applied to the axial magnetic bearings 25, 26 correspondingly to the displacement, and flows a current corresponding thereto to the coil 25a.

One emergency bearing 10 is disposed near the active axial magnetic bearings 25, 26. The other emergency bearing 11 is disposed on an end portion of the shaft 1a on the side opposite to the impeller 1. Then, an inside diameter of the emergency bearing 10 is set to be larger than a diameter (outside diameter) of the shaft 1a. Accordingly, even in the case that rotor including the impeller 1 and the shaft 1a is removed from the pump, it never comes in contact with the emergency bearing 10. Thus, by simply demounting a nut of the shaft end portion and a spacer 30 (see FIG. 3), the rotor can be removed easily, thereby facilitating the work for disassembly and reassembly.

Further, since the emergency bearings 10 and 11 are disposed on a low vacuum side, the high vacuum side can be prevented from being contaminated by dust or the like despite operation of the emergency bearings 10 and 11.

In the radial passive magnetic bearings 21, 22, 23, 24, one magnetic bearing, for example, the passive radial magnetic bearing 23 of the combination of permanent magnets 23, 24 installed near the shaft 1a of FIG. 1, is supported on a retainer 27 which is supported on a sliding mechanism 28 so that it is fixed axially V but slidable radially r. Then, a damping mechanism 29 for damping vibrations in the radial direction R of the shaft 1a is inserted between the retainer 27 and the sliding mechanism 28. By providing such a damping mechanism 29, radial vibrations of the rotor arising during rotation of the shaft 1a can be suppressed to a stable rotation.

For example, a slide bearing or Teflon may be employed as the sliding mechanism 28 for axially fixed but radially slidable support of the retainer 27. These are slightly frictional against radial movement, and hence effectively damp vibrations by absorbing the energy in a radial direction R.

Figure 3:
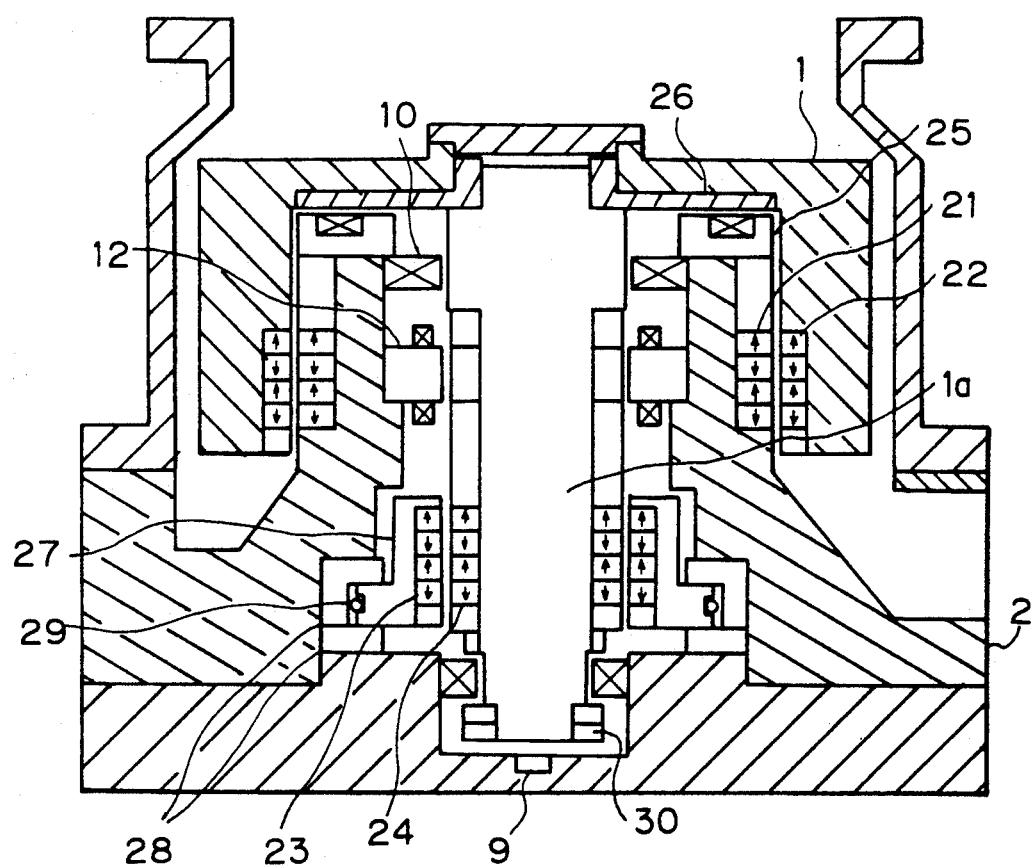
FIG. 3 is a sectional view of the embodiment of the present invention shown in more specific form.

The embodiment of the present invention described with reference to FIG. 1 is shown in FIG. 3 in more specific form.

FIG. 3 is basically the same as FIG. 1 in construction, therefore description will be omitted here.

Advantages ensured from working the present invention will be enumerated as follows:

(1) Since only one control coil is provided for controlling an axial position of the rotor, the number of control axis is only one, and thus various disadvantages arising from plurality of control axes are prevented.

(2) Damping means is capable of absorbing radial vibrations. Accordingly, rotational stability is ensured.

(3) It is very easy to demount and also disassemble the shaft and the impeller.

(4) Contamination on the high vacuum side can be prevented.

What is claimed is:

1. A turbo molecular pump including a magnetic bearing system comprising:

a rotor including an impeller connected to a shaft and a motor;

a stator positioned between the shaft and the impeller;

radial magnetic bearings provided between said rotor and said stator, said radial magnetic bearings including passive magnetic bearings each having a permanent magnet and provided on said rotor and said stator respectively, said passive radial magnetic bearings each having ring permanent magnets magnetized axially and disposed concentrically so as to radially oppose each other, pairs of concentrically disposed passive radial magnet bearings are provided between said impeller and said stator and between said shaft of said rotor and said stator, respectively, at axially spaced positions, said ring permanent magnets, disposed on the rotor, is slightly deviated in axial direction from the ring permanent magnets disposed on the stator;

an active axial magnetic bearing provided between said rotor and said stator and disposed in as vicinity where the impeller is connected to said shaft; and emergency bearings provided between said rotor and said stator and are disposed on a low vacuum side with one emergency bearing being positioned near said active axial magnetic bearing, and a diameter of said shaft is made smaller than an inside diameter of said emergency bearing near said active axial magnetic bearing.

2. The turbo molecular pump claimed in claim 1, wherein at least one of said pair of concentrically disposed radial magnet bearings includes a sliding mechanism which fixes said one magnet bearing axially but allows radial movement of the same bearing.

3. The turbo molecular pump claimed in claim 2, wherein a damping mechanism is provided in said sliding mechanism for damping radial vibrations of said one magnet bearing.

4. The turbo molecular pump claimed in claim 3, wherein said sliding mechanism and said damping mechanism are provided in one of said pair of said radial magnet bearings positioned between said shaft and said stator.

5. The turbo molecular pump claimed in any one of claims 1, 2, 3, 4 or 5, wherein each said passive radial magnet bearing comprises a group of permanent ring magnets which have a small clearance between each axially adjacent magnets.

* * * * *